United States Patent
Chang et al.

(10) Patent No.: US 7,424,738 B2
(45) Date of Patent: Sep. 9, 2008

(54) RF FIREWALL FOR A WIRELESS NETWORK

(75) Inventors: Hyokang Chang, Potomac, MD (US); Ashim K Roy, North Potomac, MD (US)

(73) Assignee: Combasis Technology, Inc., Potomac, MD (US)

( * ) Notice: Subject to any disclaimer, the term of this patent is extended or adjusted under 35 U.S.C. 154(b) by 850 days.

(21) Appl. No.: 10/896,260

(22) Filed: Jul. 21, 2004

(65) Prior Publication Data
US 2005/0020244 A1    Jan. 27, 2005

Related U.S. Application Data

(60) Provisional application No. 60/489,362, filed on Jul. 23, 2003.

(51) Int. Cl.
*G06F 9/00* (2006.01)
(52) U.S. Cl. .......................................... 726/11
(58) Field of Classification Search .................. 726/11
See application file for complete search history.

(56) References Cited

U.S. PATENT DOCUMENTS 4,498,193 A * 2/1985 Richardson .................. 455/1
7,177,294 B2 * 2/2007 Chen et al. .................. 370/338

OTHER PUBLICATIONS

Bucholtz, 1997, http://telephonyonline.com/mag/telecom_jamming_hackers_security/.*

* cited by examiner

*Primary Examiner*—Kambiz Zand
*Assistant Examiner*—Jacob Lipman
(74) *Attorney, Agent, or Firm*—Roberts, Mardula & Wertheim, LLC

(57) ABSTRACT

Limiting RF signal reception outside of a perimeter boundary to enhance security in a wireless network. A central jamming controller (CJC) communicates with one or more access points within a wireless network to determine if link activity is present within a cell controlled by a specific access point. Link activity comprises transmissions from an authorized communication device (ACD) to the access point and transmissions from the access point to the ACD. When link activity is detected, the CJC directs a jamming antenna system to produce a jamming signal and to transmit the jamming signal outside of the perimeter boundary defined by the WLAN. The jamming signal comprises noise transmitted within the bandwidth of the channel being used by the access point and the ACD to communicate within the cell. An unauthorized communication device (UCD) outside of the perimeter boundary will be prevented from receiving the communication between the access point and the ACD because of the jamming signal.

23 Claims, 6 Drawing Sheets

RF FIREWALL FOR A WIRELESS NETWORK

CROSS REFERENCE TO RELATED APPLICATIONS

This application claims priority under 35 U.S.C. § 119(e) from provisional application No. 60/489,362, filed Jul. 23, 2003. The 60/489,362 provisional application is incorporated by reference herein, in its entirety, for all purposes.

BACKGROUND

The present invention relates generally to RF link security of a wireless network. In particular, the present invention addresses limiting RF signal reception outside of a perimeter boundary to enhance security in a wireless network.

The deployment of wireless networks, particularly wireless local area networks (WLAN), in the small-office home-office (SOHO) environment has been quite successful in recent years. WLAN deployment in the enterprise, however, has not been able to replicate the success of WLAN in SOHO environment at least in part due to security concerns arising from the potential for RF leakage outside of a desired coverage area. Such RF leakage creates the potential for unauthorized communication devices (UCDs) to receive signals originating from the wireless network and to gain access to sensitive information.

Network equipment designers have implemented a variety of security protocols to prevent access by UCDs to a wireless network. These protocols include WLAN encryption, Internet Protocol (IP) encryption, and so on. These approaches assume that the signals from a wireless network are accessible to a UCD and attempt to make the content of those signals inaccessible and/or to prevent access to network resources. All of these data packet layer techniques, however, suffer from one or more shortcomings. Historically, encryption and authentication systems are constantly under attack and many are ultimately circumvented. Even without a real-time decryption capability, an UCD may be able to access a wireless network, record critical corporate information and use more powerful computing resources to decrypt the stolen data at a later time.

What would be useful, therefore, is a system and method for reducing the probability that a signal from a wireless network will be received by a UCD outside of a perimeter boundary by jamming signals attributable to the wireless network.

SUMMARY

An embodiment of the present invention is a system and method for reducing the probability that a signal from a WLAN will be received by a UCD by jamming the signals attributable to a WLAN outside of a perimeter boundary. A central jamming controller (CJC) communicates with the access points within the WLAN to determine if link activity is present within a cell controlled by a specific access point. Link activity comprises transmissions from an ACD to the access point and transmissions from the access point to the ACD (ACD). When link activity is detected, the CJC directs a jamming antenna system to produce a jamming signal and to transmit the jamming signal outside of the perimeter boundary defined by the WLAN. The jamming signal comprises noise transmitted within the bandwidth of the channel being used by the access point and the ACD to communicate within the cell. An unauthorized communication device (UCD) outside of the perimeter boundary will be prevented from receiving the communication between the access point and the ACD because of the jamming signal.

It is therefore an aspect of the present invention to limit the reception of signals attributable to a WLAN outside of a perimeter boundary.

Another aspect of the present invention is to block the reception of signals attributable to a WLAN outside of a perimeter boundary by transmitting a jamming signal when either an uplink or a downlink RF link signal is transmitted for the duration of the link signal transmission.

Still another aspect of the present invention is to block the reception of signals attributable to a WLAN outside of a perimeter boundary by transmitting a jamming signal when either an uplink or a downlink RF link signal is transmitted for the duration of the transmission of the preamble and header portion of the link signal transmission.

Another aspect of the present invention is to use a directional antenna to direct the power of the jamming signal outward from the perimeter boundary of the WLAN.

Yet another aspect of the present invention is to use an RF circuit within the jamming antenna to generate noise spectrums of N frequency channels (where N is equal to or greater than 1) wherein the frequency of each channel is programmable and noise generation in each channel is independently performed.

These and other aspects of the present invention will become apparent from a review of the general and detailed descriptions that follow.

An embodiment of the present invention is a system and method for reducing the probability that a signal from a WLAN will be received by a UCD by jamming signals attributable to the WLAN outside of a perimeter boundary. By preventing unauthorized access to the WLAN, an RF "firewall" is created around the wireless network. In this embodiment, a central jamming controller (CJC) communicates with the access points within the WLAN to determine if link activity is present within a cell controlled by a specific access point. Link activity comprises transmissions from an ACD to the access point and transmissions from the access point to the ACD (ACD). When link activity is detected, the CJC directs a jamming antenna system to produce a jamming signal and to transmit the jamming signal outside of the perimeter boundary defined by the WLAN. The jamming signal comprises noise transmitted within the bandwidth of the channel being used by the access point and the ACD to communicate within the cell. An unauthorized communication device (UCD) outside of the perimeter boundary will be prevented from receiving the communication between the access point and the ACD because of the jamming signal.

In an embodiment of the present invention, the jamming signal is transmitted for the duration of the communication between the access point and the ACD. In an alternate embodiment of the present invention, the jamming signal is transmitted only during the transmission of the header component of the communication between the access point and the ACD.

While the embodiments described above relate to WLAN environments, the present invention is not so limited. The system and methods taught by the present invention may be practiced in any wireless networks. By way of illustration and not as a limitation, the network may be a wireless local loop (WLL), an ultra wideband (UWB) network, and a micro-cellular network. More specifically, the teachings of the present invention may be directly applied to the IEEE 802.11 series of standards.

An embodiment of the present invention provides an RF firewall for securing a wireless network. The RF firewall comprises a central jamming controller (CJC) adapted to issue a jamming command, a jamming antenna system in communication with the CJC via a control link adapted to produce a jamming signal in response to the jamming command from the CJC, and an antenna, such as a directional antenna, adapted to broadcast the jamming signal outside of a perimeter boundary defined by the wireless network. The jamming antenna system comprises "N" jamming signal generators, where N is equal to or greater than 1, adapted to generate noise spectrums at up to N channels; and means to select the frequency of each of the N channels.

The wireless network may be a wireless local area network, a wireless local loop, an ultra wideband network, a micro-cellular network, and an IEEE 802.11 compatible network. The CJC comprises an interface with an access point within the wireless network, means for receiving a link activity signal indicative of authorized link activity within a cell controlled by the access point, and means to issue the jamming command to the jamming antenna system via the control link in response to receipt of the link activity signal.

In another embodiment of the present invention, the authorized link activity within the cell comprises transmission of a signal from an authorized communication device to the access point via a channel. In this embodiment, the jamming signal comprises a noise signal having a bandwidth within the bandwidth of the signal used by the authorized communication device. The jamming signal may be a continuous signal broadcast simultaneously with, and for the duration of, the signal transmitted from the authorized communication device. Alternatively, the jamming signal is a pulsed signal broadcast simultaneously with, and for the duration of, the signal transmitted from the authorized communication device.

In still another embodiment of the present invention, the jamming signal is a continuous signal broadcast simultaneously with, and for the duration of, a header component of the signal transmitted from the authorized communication device. In yet another embodiment of the present invention, the jamming signal is a pulsed signal broadcast simultaneously with, and for the duration of, a header component of the signal transmitted from the authorized communication device.

In another embodiment of the present invention, the authorized link activity within the cell comprises transmission of a signal from the access point to an authorized communication device via a channel. In this embodiment, the jamming signal comprises a noise signal having a bandwidth within the bandwidth of the channel used by the authorized communication device. The jamming signal may be a continuous signal broadcast simultaneously with, and for the duration of, the signal transmitted from the authorized communication device. Alternatively, the jamming signal is a pulsed signal broadcast simultaneously with, and for the duration of, the signal transmitted from the authorized communication device.

In still another embodiment of the present invention, the jamming signal is a continuous signal broadcast simultaneously with, and for the duration of, a header component of the signal transmitted from the authorized communication device. In yet another embodiment of the present invention, the jamming signal is a pulsed signal broadcast simultaneously with, and for the duration of, a header component of the signal transmitted from the authorized communication device.

An embodiment of the present invention provides a method for limiting RF signal reception from a wireless network outside a perimeter boundary defined by the wireless network. A link activity status signal indicative of authorized link activity within a cell controlled by an access point within the wireless network is received. In response to the receipt of the link activity signal, a jamming signal is produced. The jamming signal is broadcast outside of the perimeter boundary. The wireless network may be a wireless local area network, a wireless local loop, an ultra wideband network, a micro-cellular network, and an IEEE 802.11 compatible network. The CJC comprises an interface with an access point within the wireless network, means for receiving a link activity signal indicative of authorized link activity within a cell controlled by the access point, and means to issue the jamming command to the jamming antenna system via the control link in response to receipt of the link activity signal.

In an embodiment of the present invention, receiving a link activity status signal indicative of authorized link activity within a cell controlled by an access point within the wireless network comprises receiving a link activity status signal indicative of a transmission of a signal from an authorized communication device to the access point via a channel. In this embodiment, producing a jamming signal in response to the receipt of the link activity signal comprises producing a noise signal having a bandwidth within the channel used by the authorized communication device. In yet another embodiment of the present invention, broadcasting the jamming signal outside of the perimeter boundary comprises broadcasting a continuous jamming signal simultaneously with, and for the duration of, the signal transmitted from the authorized communication device. Alternatively, broadcasting the jamming signal outside of the perimeter boundary comprises broadcasting a pulsed jamming signal simultaneously with, and for the duration of, the signal transmitted from the authorized communication device.

In another embodiment of the present invention, broadcasting the jamming signal outside of the perimeter boundary comprises broadcasting a continuous jamming signal simultaneously with, and for the duration of, a header component of the signal transmitted from the authorized communication device. In this embodiment, broadcasting the jamming signal outside of the perimeter boundary comprises broadcasting a pulsed jamming signal simultaneously with, and for the duration of, a header component of the signal transmitted from the authorized communication device.

In yet another embodiment of the present invention, receiving a link activity status signal indicative of authorized link activity within a cell controlled by an access point within the wireless network comprises receiving a link activity status signal indicative of a transmission of a signal from the access point to an authorized communication device via a channel. In this embodiment, producing a jamming signal in response to the receipt of the link activity signal comprises producing a noise signal having a bandwidth within the bandwidth of the channel used by the authorized communication device. In one embodiment of the present invention, broadcasting the jamming signal outside of the perimeter boundary comprises broadcasting a continuous jamming signal simultaneously with, and for the duration of, the signal transmitted from the authorized communication device.

In another embodiment of the present invention, broadcasting the jamming signal outside of the perimeter boundary comprises broadcasting a pulsed jamming signal simultaneously with, and for the duration of, the signal transmitted from the authorized communication device. In an alternate embodiment of the present invention, broadcasting the jamming signal outside of the perimeter boundary comprises broadcasting a continuous jamming signal simultaneously with, and for the duration of, a header component of the signal transmitted from the authorized communication device. In still another embodiment of the present invention, broadcasting the jamming signal outside of the perimeter boundary comprises broadcasting a pulsed jamming signal simultaneously with, and for the duration of, a header component of the signal transmitted from the authorized communication device.

DETAILED DESCRIPTION

Figure 1:
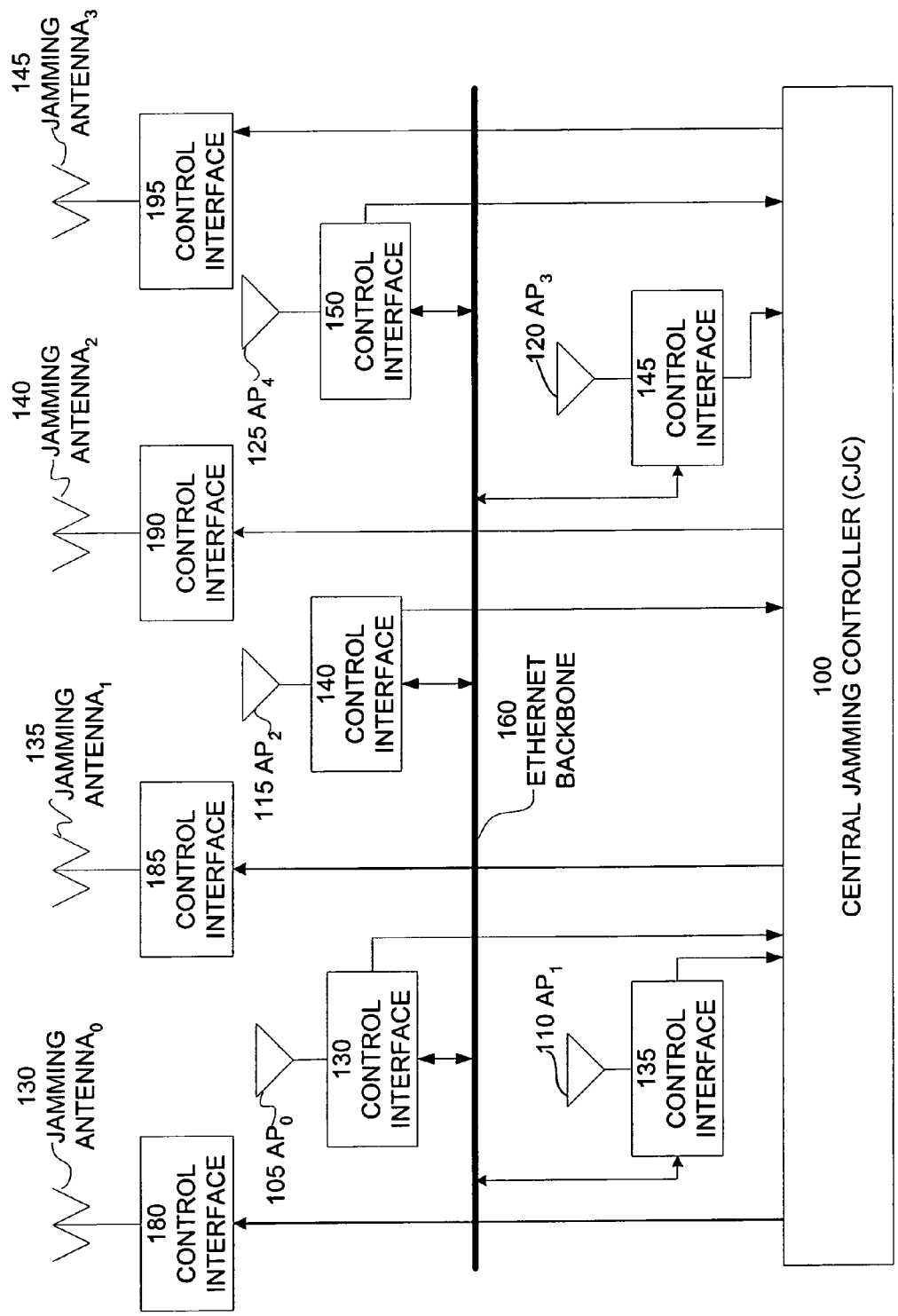
FIG. 1 illustrates a block diagram of the components of a wireless network protected by an RF firewall according an embodiment of the present invention.

An embodiment of the present invention is a system and method for reducing the probability that a signal from a WLAN will be received by a UCD by jamming signals attributable to the WLAN outside of a perimeter boundary, thus creating an RF firewall around the wireless network. FIG. 1 illustrates a block diagram of the components of a wireless network protected by an RF firewall according to an embodiment of the present invention. A central jamming controller (CJC) 100 interfaces with access points $AP_0$ 105, $AP_1$ 110, $AP_2$ 115, $AP_3$ 120, and $AP_4$ 125 through control interfaces 155, 160, 165, 170 and 175 respectively. CJC 100 also interfaces with jamming antennas $J_0$ 130, $J_1$ 135, $J_2$ 140 and $J_3$ 145 through control interfaces 180, 185, 190 and 195 respectively.

The CJC 100 interfaces with the control interfaces through wired connections. By way of illustration, the control interface 155 connected to access point $AP_0$ 105 provides link activity status to CJC 100. Link activity status indicates any link activity in a cell whether it is uplink activity (an ACD to the Access Point) or downlink activity (Access Point to the an ACD). The control interface 190 connected to jamming antenna $J_2$ 140 responds to signals from CJC 100 to transmit a jamming signal of a specified power when link activity is in a cell that is proximate to jamming antenna $J_2$ 140.

Figure 2:
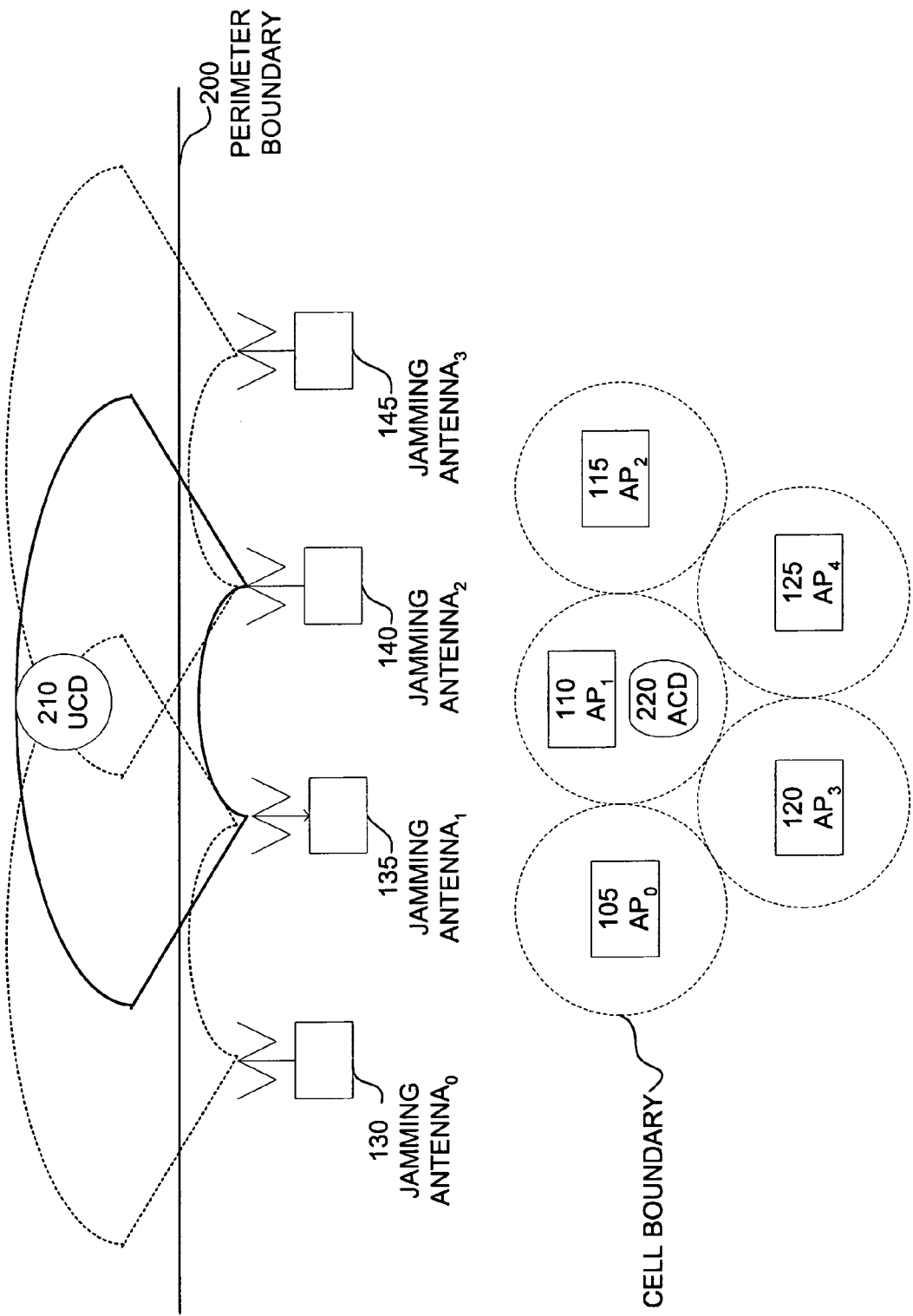
FIG. 2 illustrates a deployment of jamming antennas in accordance with an embodiment of the present invention.

FIG. 2 illustrates a deployment of jamming antennas in accordance with an embodiment of the present invention. Access points $AP_0$, $AP_1$, $AP_2$, $AP_3$, and $AP_4$ (105, 110, 115, 120 and 125 respectively) are located at various distances from a perimeter boundary 200. (Access points $AP_0$, $AP_1$, $AP_2$, $AP_3$, and $AP_4$ are described as "inside" the perimeter.) An access point forms a cell defined by the strength of its signal. An unauthorized communication device (UCD) 210 is located outside the perimeter boundary 200. An authorized communication device (ACD) 220 is operated within the cell defined by $AP_1$ 110. Jamming antennas $J_0$-$J_3$ (130, 135, 140 and 145 respectively) are located along the perimeter boundary 200 to form an RF firewall. In the present embodiment, the RF firewall is illustrated as a wall in a two-dimensional plane. However, the present invention is not so limited. In an alternate embodiment (not illustrated) of the present invention, the RF firewall is a shell in a three dimensional space around a wireless network.

The RF firewall reduces the probability that the UCD 210 will receive a signal from an access point by transmitting one or more jamming signals that block the reception of AP signals outside of the perimeter boundary. In an embodiment of the present invention, the jamming signal comprises noise transmitted within a defined block of the RF spectrum. As illustrated in FIG. 2, the degree of jamming required for access is highest for cells right along the RF firewall (first layer cells) and modest for cells adjacent to the first layer cells (second layer cells) but further from the perimeter boundary. No jamming is required for third layer cells (not illustrated) even further from the perimeter boundary because the strength of signals attributed to these cells will be insignificant before the signals reach the RF firewall. For an AP cell in the first layer, jamming is performed using the two nearest antennas, i.e., $J_0$ and $J_1$ (125 and 130 respectively) for $AP_0$ 105, $J_1$ 135 and $J_2$ 140 for $AP_1$ 110, and so on. For an AP cell in the second layer jamming is performed with just a single antenna nearest to it, i.e., $J_1$ 135 for $AP_3$ 120, $J_2$ 140 for $AP_4$ 125, and so on.

Figure 3:
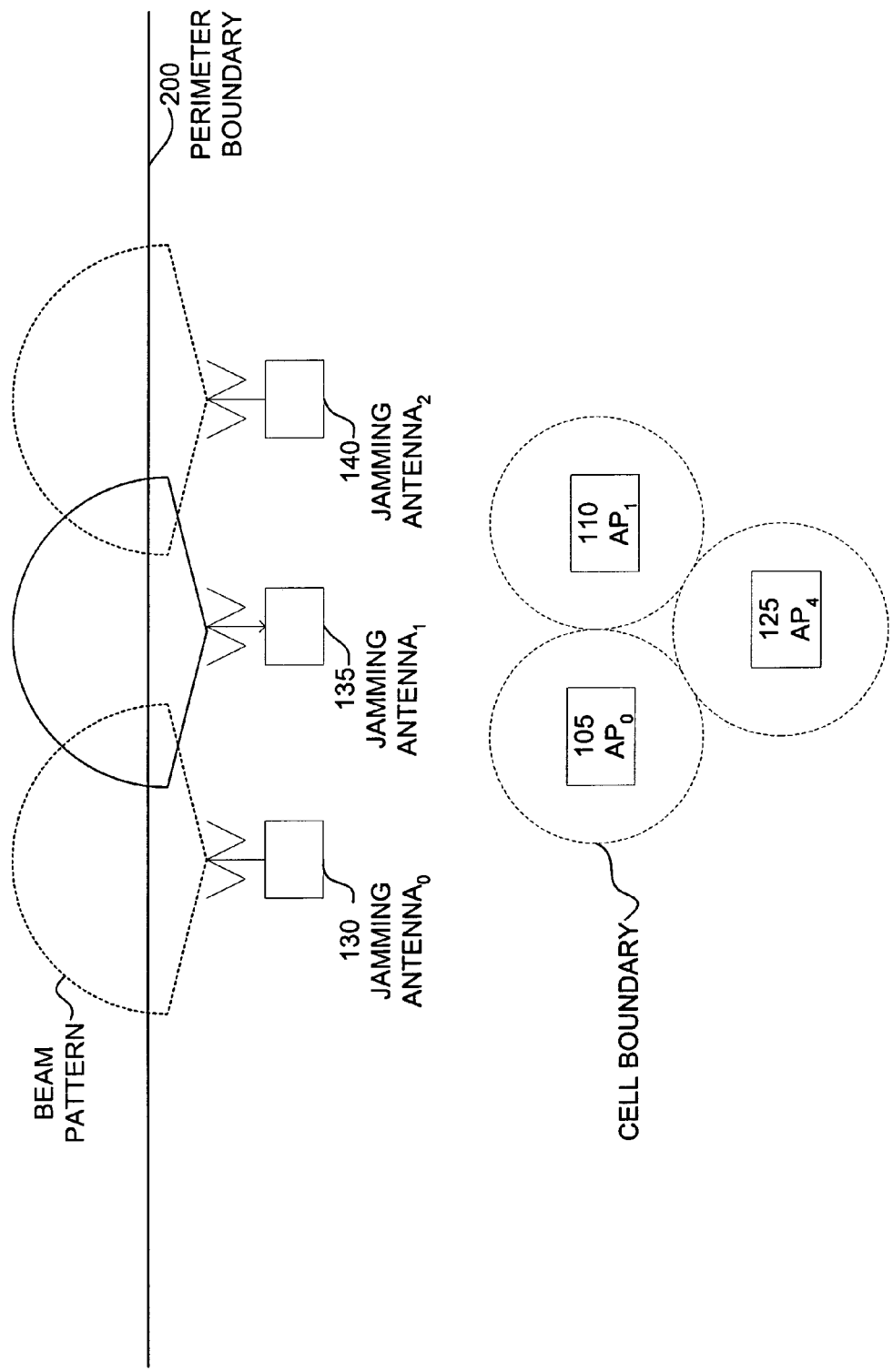
FIG. 3 illustrates a beam pattern of a deployment of jamming antennas in accordance with an embodiment of the present invention.

FIG. 3 illustrates a beam pattern of a deployment of jamming antennas in accordance with an embodiment of the present invention. Jamming antennas $J_0$, $J_1$, and $J_2$ (130, 135, and 140 respectively) are directional antennas having a semi-circular beam pattern that is oriented to project outward from the perimeter boundary 200 so that jamming does not interfere with normal link activities of the access points $AP_0$ 105, $AP_1$ 120, and $AP_4$ 125. However, this is not meant as a limitation. As will be apparent to those skilled in the art, depending upon the physical attributes of the perimeter being secured, antennas with other beam patterns may be selected without departing from the scope of the present invention.

Figure 4:
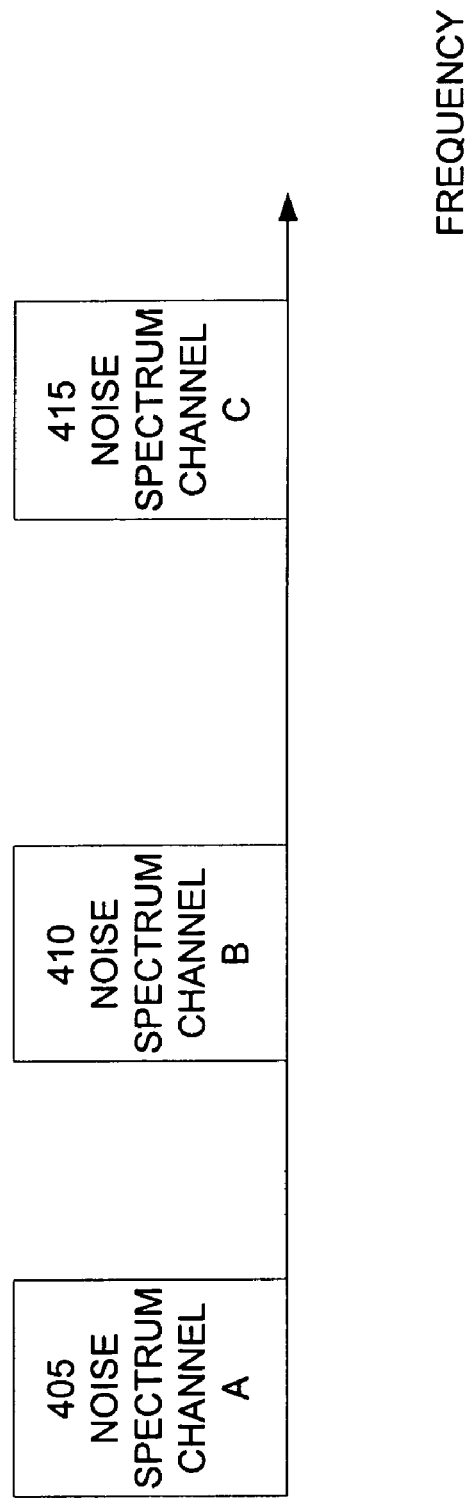
FIG. 4 illustrates the noise spectrum from a jamming antenna in accordance with an embodiment of the present invention.

FIG. 4 illustrates the noise spectrum of a jamming signal from a jamming antenna in accordance with an embodiment of the present invention. In the embodiment illustrated in FIG. 3, each jamming antenna is capable of simultaneously transmitting jamming signals corresponding to the three discrete channels used by access points $AP_0$ 105, $AP_1$ 110, and $AP_4$ 125. However, the invention is not so limited. In an alternative embodiment of the present invention, the jamming antenna is adapted to simultaneously transmit jamming signals corresponding to the channels of all neighboring AP cells.

Figure 5:
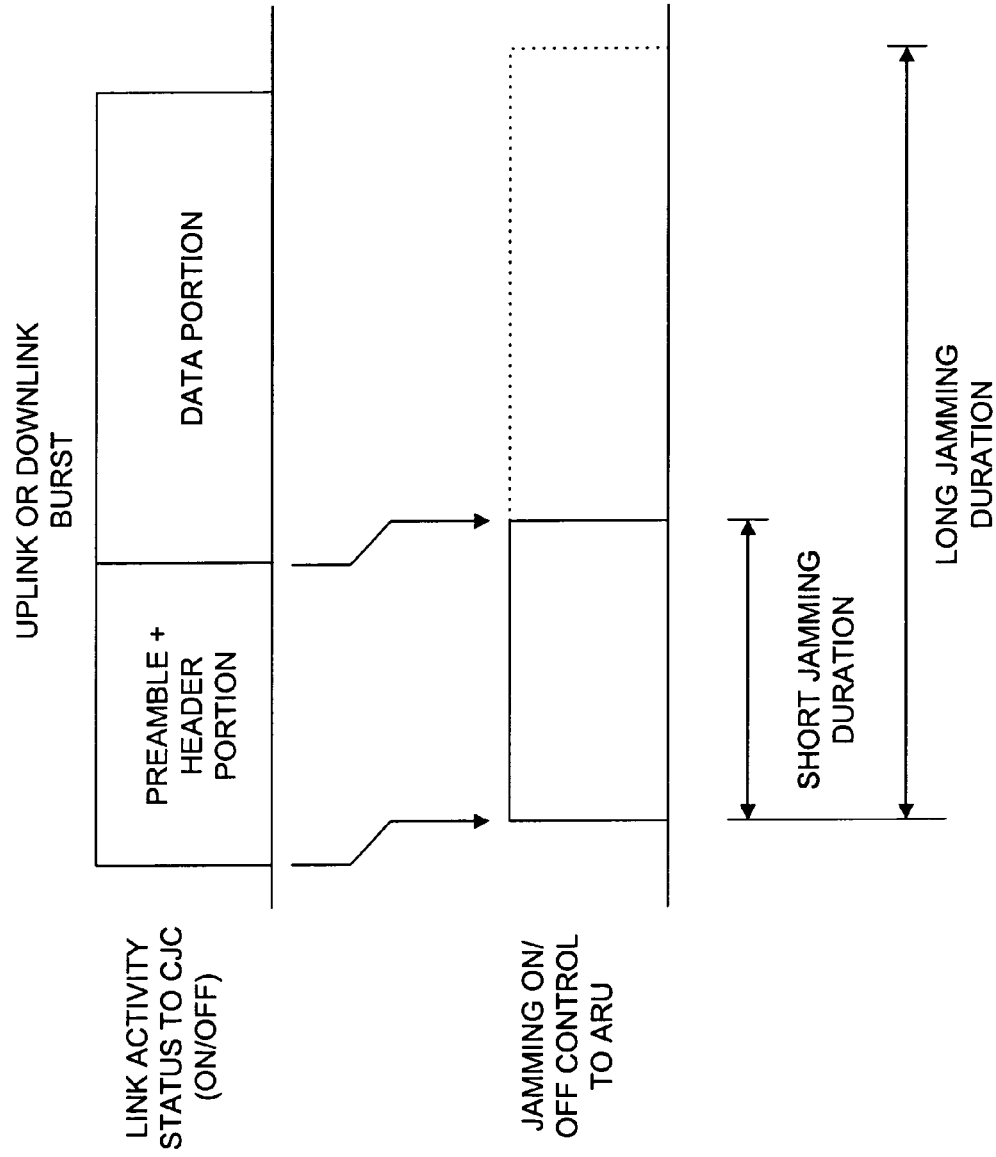
FIG. 5 illustrates two jamming periods of an uplink or downlink burst according to an embodiment of the present invention.

Referring again to FIG. 1, when an access point $AP_n$ reports link activity within its cell, the CJC initiates jamming by enabling the corresponding channel of the nearest jamming antennas. In this way jamming is performed synchronously with the link activity as illustrated in FIG. 5. Conversely, no jamming is performed if there is no link activity. The jamming duration can be as short as the preamble and header portion of the burst or as long as the entire burst. Even the brief jamming over the preamble and header portion, however, can be very effective since it inhibits recovery of symbol timing and information on subsequent burst structure. Without initial training and header information demodulation of a burst is virtually impossible.

In another embodiment of the present invention, the jamming signal is pulsed over the duration of the link activity. Even if the demodulator of an UCD somehow acquired symbol timing and parameters for correct demodulation, it would need to keep track of symbol timing continuously for reliable demodulation. By jamming the burst periodically it can effectively deprive the demodulator of an opportunity to establish stable symbol timing In another embodiment of the present invention, the jamming signal is pulsed over the duration of the link activity. The purpose of the pulsed jamming is to disturb periodically the demodulation process by an unauthorized communication device outside a perimeter boundary so that the integrity of received data cannot be maintained. In order to destroy data integrity effectively, the pulse duration needs to span at least one complete block of interleaved data or 8 microseconds. Assuming that a BER (bit error rate) of 20% makes the data practically unusable, the duty cycle of pulsed jamming can be as low as 20/80 (on/off).

Figure 6:
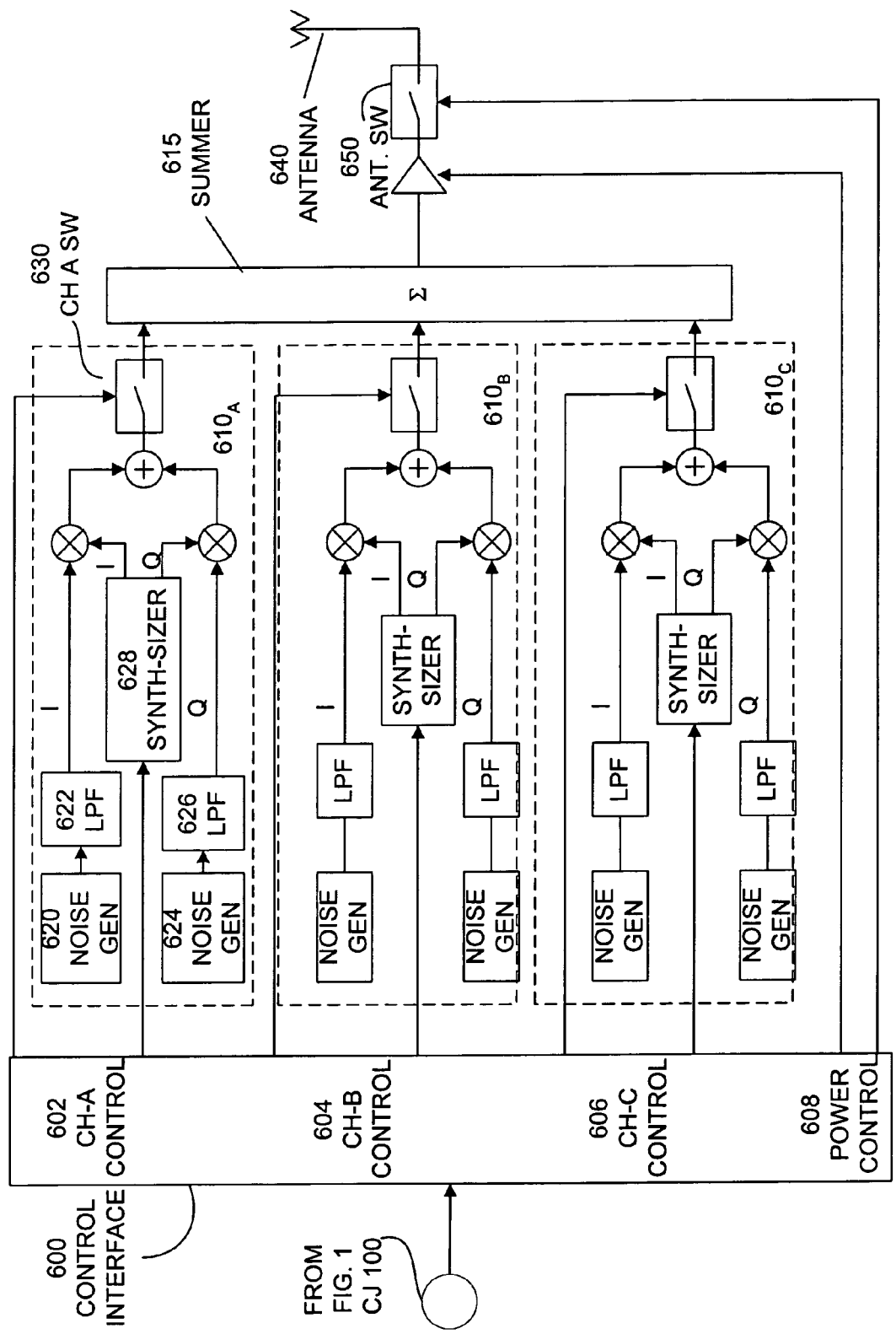
FIG. 6 illustrates a block diagram of jamming antenna system according to an embodiment of the present invention.

FIG. 6 illustrates a block diagram of a jamming antenna system according to an embodiment of the present invention. As illustrated the jamming antenna system comprises a jamming antenna control interface 600, three jamming signal generators $610_A$, $610_B$, and $610_C$, and an antenna 620. However, this is not meant as a limitation. In an alternative embodiment of the present invention, the jamming antenna system is adapted to simultaneously transmit jamming signals corresponding to the channels of all neighboring AP cells and comprises the number of jamming signal generators $610_N$ equal to the number of channels for which jamming signals are required.

The jamming signals are controlled by the CJC 100 acting through jamming antenna control interface 600. The jamming signals that are generated in response to a command from the CJC 100 are combined at a summer 615 and sent to an antenna 620 for transmission.

Referring again to the three-channel configuration illustrated in FIG. 6, the jamming antenna control interface for each channel responds independently to a control signal from CJC 100 that is directed to a particular channel. By way of illustration, a control signal from CJC 100 comprises an antenna on/off instruction, a channel number, a channel on/of instruction, and an output power instruction. Jamming signal generator $610_A$ comprises a noise generator 620 connected to a low pass filer 622, a noise generator 624 connected to a low pass filter 626, and a synthesizer 628. The outputs of low pass filer 622, low pass filter 626, and synthesizer 628 are combined to produce a jamming signal effective for channel A. If jamming of channel A is desired, channel A switch 630 is set to send the channel A jamming signal to summer 615 and antenna switch 640 is set to send the out of summer 615 to antenna 640. Although not illustrated in FIG. 6, jamming signal generators $610_B$ and $610_C$ operated in the same manner for channels B and C respectively.

The power level at each jamming antenna is set by the CJC 100 to lower the carrier-to-interference ratio (CIR) significantly outside of the RF firewall while causing negligible amount of interference to a valid link within the enterprise. For example, assuming that the threshold of CIR for reliable demodulation is 20 dB, the CJC 100 establishes a power setting that lowers the CIR outside of the RF firewall below 10 dB, but maintains a CIR above the threshold value within an AP cell. The threshold CIR is a minimum CIR level that supports error-free data reception at the cell boundary for a given AP cell. The threshold CIR is a function of the AP type, AP transmit power level, and link direction. Alternatively, the power level at jamming antenna can be set such that the bit error rate (BER) due to jamming at the receiver just outside of RF firewall is at least 20% while the BER at the receiver just inside of RF firewall is less than 1%.

In an embodiment of the present invention, the AP is an IEEE 802.11x device. For example, and not as a limitation, the AP may be an IEEE 802.11b, 802.11a, or 802.11g compatible device. The AP transmit power level is part of the AP configuration parameters. The information on link direction indicating whether it is uplink or downlink is sent from an AP to CJC 100 via the corresponding link status line. Once the threshold CIR is determined, the CJC 100 sets the jamming power level such that the CIR along the perimeter boundary is at least J dB below the threshold CIR where J is in the range of 6 to 10.

While the embodiments described above relate to a WLAN environment, the present invention is not so limited. The system and methods taught by the present invention may be practiced in any wireless networks. By way of illustration and not as a limitation, the network may be a wireless local loop (WLL), an ultra wideband (UWB) networks, and a micro-cellular networks. More specifically, the teachings of the present invention may be directly applied to the IEEE 802.11 series of standards.

A system and method for reducing the probability that a signal from a wireless network will be received by a UCD by jamming signals attributable to the wireless network outside of a perimeter boundary has now been illustrated. It will also be understood that the invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method for limiting RF signal reception from a wireless network outside a perimeter boundary defined by the wireless network, the method comprising:
   receiving a link activity status signal indicative of authorized link activity within a cell controlled by an access point within the wireless network;
   producing a jamming signal in response to the receipt of the link activity signal; and
   broadcasting the jamming signal outside of the perimeter boundary.

2. The method for limiting RF signal reception from a wireless network outside a perimeter boundary defined by the wireless network of claim 1, wherein the wireless network is selected from the group consisting of wireless local area network, a wireless local loop, an ultra wideband network, a micro-cellular network, and a IEEE 802.11 compatible network.

3. The method for limiting RF signal reception from a wireless network outside a perimeter boundary defined by the wireless network of claim 1, wherein receiving a link activity status signal indicative of authorized link activity within a cell controlled by an access point within the wireless network comprises receiving a link activity status signal indicative of a transmission of a signal from the access point to an authorized communication device via a channel.

4. The method for limiting RF signal reception from a wireless network outside a perimeter boundary defined by the wireless network of claim 3, wherein producing a jamming signal in response to the receipt of the link activity signal comprises producing a noise signal having a bandwidth within the bandwidth of the channel used by the authorized communication device.

5. The method for limiting RF signal reception from a wireless network outside a perimeter boundary defined by the wireless network of claim 3, wherein broadcasting the jamming signal outside of the perimeter boundary comprises broadcasting a continuous jamming signal simultaneously with, and for the duration of, the signal transmitted from the authorized communication device.

6. The method for limiting RF signal reception from a wireless network outside a perimeter boundary defined by the wireless network of claim 1, wherein receiving a link activity status signal indicative of authorized link activity within a cell controlled by an access point within the wireless network comprises receiving a link activity status signal indicative of a transmission of a signal from an authorized communication device to the access point via a channel.

7. The method for limiting RF signal reception from a wireless network outside a perimeter boundary defined by the wireless network of claim 6, wherein broadcasting the jamming signal outside of the perimeter boundary comprises broadcasting a continuous jamming signal simultaneously with, and for the duration of, the signal transmitted from the authorized communication device.

8. The method for limiting RF signal reception from a wireless network outside a perimeter boundary defined by the wireless network of claim 6, wherein broadcasting the jamming signal outside of the perimeter boundary comprises broadcasting a continuous jamming signal simultaneously with, and for the duration of, a header component of the signal transmitted from the authorized communication device.

9. The method for limiting RF signal reception from a wireless network outside a perimeter boundary defined by the wireless network of claim 6, wherein producing a jamming signal in response to the receipt of the link activity signal comprises producing a noise signal having a bandwidth within the channel used by the authorized communication device.

10. The method for limiting RF signal reception from a wireless network outside a perimeter boundary defined by the wireless network of claim 9, wherein broadcasting the jamming signal outside of the perimeter boundary comprises broadcasting a continuous jamming signal simultaneously with, and for the duration of, a header component of the signal transmitted from the authorized communication device.

11. An RF firewall for securing a wireless network, the RF firewall comprising:
    a central jamming controller (CJC) adapted to issue a jamming command;
    a jamming antenna system in communication with the CJC via a control link adapted to produce a jamming signal in response to the jamming command from the CJC; and
    an antenna adapted to broadcast the jamming signal outside of a perimeter boundary defined by the wireless network.

12. The RF firewall of claim 11, wherein the wireless network is selected from the group consisting of wireless local area network, a wireless local loop, an ultra wideband network, a micro-cellular network, and an IEEE 802.11 compatible network.

13. The RF firewall of claim 11, wherein the antenna is a directional antenna.

14. The RF firewall of claim 11, wherein the jamming system antenna comprises:
    "N" jamming signal generators, where N is equal to or greater than 1, adapted to generate noise spectrums at up to N channels; and
    means to select the frequency of each of the N channels.

15. The RF firewall of claim 11, wherein the CJC comprises:
    an interface with an access point within the wireless network;
    means for receiving a link activity signal indicative of authorized link activity within a cell controlled by the access point; and
    means to issue the jamming command to the jamming antenna system via the control link in response to receipt of the link activity signal.

16. The RF firewall of claim 15, wherein the authorized link activity within the cell comprises transmission of a signal from an authorized communication device to the access point via a channel.

17. The RF firewall of claim 16, wherein the jamming signal comprises a noise signal having a bandwidth within the bandwidth of the signal used by the authorized communication device.

18. The RF firewall of claim 16, wherein the jamming signal is a continuous signal broadcast simultaneously with, and for the duration of, the signal transmitted from the authorized communication device.

19. The RF firewall of claim 16, wherein the jamming signal is a continuous signal broadcast simultaneously with, and for the duration of, a header component of the signal transmitted from the authorized communication device.

20. The RF firewall of claim 15, wherein authorized link activity within the cell comprises transmission of a signal from the access point to an authorized communication device via a channel.

21. The RF firewall of claim 20, wherein the jamming signal comprises a noise signal having a bandwidth within the bandwidth of the channel used by the authorized communication device.

22. The RF firewall of claim 20, wherein the jamming signal is a continuous signal broadcast simultaneously with, and for the duration of, the signal transmitted from the authorized communication device.

23. The RF firewall of claim 20, wherein the jamming signal is a continuous signal broadcast simultaneously with, and for the duration of, a header component of the signal transmitted from the authorized communication device.

* * * * *